(12) United States Patent
Grover (10) Patent No.: US 9,068,668 B2
(45) Date of Patent: Jun. 30, 2015

(54) MECHANICALLY LATCHING SOLENOID VALVE

(71) Applicant: Benjamin T. Grover, Maple Valley, WA (US)

(72) Inventor: Benjamin T. Grover, Maple Valley, WA (US)

(73) Assignee: PACCAR Inc, Bellevue, WA (US)

(*) Notice: Subject to any disclaimer, the term of this patent is extended or adjusted under 35 U.S.C. 154(b) by 148 days.

(21) Appl. No.: 13/830,669

(22) Filed: Mar. 14, 2013

(65) Prior Publication Data

US 2014/0264113 A1    Sep. 18, 2014

(51) Int. Cl.
*F16K 31/06*    (2006.01)
*F16K 31/10*    (2006.01)
*F16K 31/524*    (2006.01)

(52) U.S. Cl.
CPC .............. *F16K 31/0655* (2013.01); *F16K 31/10* (2013.01); *F16K 31/52408* (2013.01)

(58) Field of Classification Search
CPC . F16K 31/52408; F16K 31/10; F16K 31/105; F16K 31/0655
USPC .......................... 251/129.15, 129.2, 215, 230
See application file for complete search history.

(56) References Cited

U.S. PATENT DOCUMENTS

| 1,765,377 | A | * | 6/1930 | Marks | 251/129.2 |
|---|---|---|---|---|---|
| 2,340,092 | A | | 1/1944 | Wells | |
| 3,173,646 | A | | 3/1965 | Wilcox | |
| 3,414,012 | A | | 12/1968 | McNutt | |
| 3,780,980 | A | * | 12/1973 | Kallel | 251/129.2 |
| 3,808,571 | A | | 4/1974 | Gerry | |
| 3,895,331 | A | | 7/1975 | Saarem | |
| 4,327,344 | A | | 4/1982 | Luckenbach | |
| 4,494,096 | A | | 1/1985 | Fuzzell | |
| 4,771,255 | A | | 9/1988 | Shull | |
| 5,573,224 | A | * | 11/1996 | Kim | 251/30.04 |
| 5,599,003 | A | | 2/1997 | Seemann | |
| 5,727,591 | A | * | 3/1998 | Doll | 137/554 |
| 6,262,648 | B1 | | 7/2001 | Lammers | |
| 6,267,351 | B1 | | 7/2001 | Schneider | |
| 6,669,165 | B2 | | 12/2003 | Burke | |
| 8,186,647 | B2 | * | 5/2012 | Chen et al. | 251/129.2 |
| 2003/0164192 | A1 | | 9/2003 | Herbert | |
| 2006/0254328 | A1 | | 11/2006 | Pearson | |
| 2009/0256091 | A1 | | 10/2009 | Nordstrom | |
| 2009/0256093 | A1 | * | 10/2009 | Chen et al. | 251/129.15 |
| 2010/0127807 | A1 | | 5/2010 | Hammond | |

FOREIGN PATENT DOCUMENTS

FR    2 612 276 A1    9/1988
JP    59-164474 A    9/1984

OTHER PUBLICATIONS

International Search Report and Written Opinion mailed Jul. 10, 2014, issued in corresponding International Application No. PCT/US2014/021375, filed Mar. 6, 2014, 6 pages.

* cited by examiner

*Primary Examiner* — William McCalister
*Assistant Examiner* — Ian Paquette
(74) *Attorney, Agent, or Firm* — Christensen O'Connor Johnson Kindness PLLC

(57) ABSTRACT

A linear actuated valve controls the flow of fluid between a first passageway and a second passageway. The valve can be solenoid actuated so as to selectively permit and prohibit fluid flow communication between the first passageway and the second passageway. The valve can include a mechanical latch that provides a de-energized yet valve open position.

13 Claims, 7 Drawing Sheets

MECHANICALLY LATCHING SOLENOID VALVE

BACKGROUND

Solenoid-actuated valves are widely used in the mechanical arts for a wide variety of applications. For example, solenoid-actuated valves are used in refrigerant circuits, electrohydraulic braking systems, evaporative control systems, and in compressed air systems. Solenoid-actuated valves provide a mechanism for electronically controlling the flow of a fluid in various hydraulic and pneumatic systems.

In a conventional solenoid-actuated valve, a movable armature is slidably disposed in a chamber that is surrounded in the longitudinal direction by a coil that can be energized to produce a desired magnetic field within the chamber. A magnetic pole piece is provided at one end of the chamber and a spring, such as a coil spring, is disposed against the armature, providing a biasing force urging the armature away from the pole piece. The pole piece and the armature are made substantially from ferrous material(s), and are positioned in the chamber such that when the coil is energized, the magnetic field will tend to urge the armature toward the pole piece, against the elastic force of the spring. In the desired operation, therefore, when the coil is not energized, the slideable armature is urged toward a first position away from the pole piece, and when the coil is energized, the armature is urged toward a second position, toward the pole piece. Such movement of the armature may be utilized so as to open and close the valve.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present invention, a solenoid actuator is provided. The actuator includes a bobbin having a longitudinally extending bore, a plunger rotatably and slideably disposed within the bore of the bobbin, a spring configured to bias the plunger in a first direction, and a solenoid coil disposed in surrounding relationship with the bobbin. In some embodiments, the solenoid coil has an energized state and a non-energized state, where the solenoid coil is capable of being energized to selectively move the plunger in a second direction opposite the first direction during the energized state. The actuator further includes a latching mechanism. The latching mechanism in some embodiments includes a plurality of upper cam surfaces opposing a plurality of lower cam surfaces, the upper and lower cam surfaces associated with the bore, and a plurality of cam elements extending radially from the plunger, each cam element comprising an upper cam surface and a lower cam surface. In some embodiments, movement of the plunger in the second direction engages the upper cam surfaces of the plunger with the upper cam surfaces associated with the bore to rotate the plunger, and movement of the plunger in the first direction engages the lower cam surfaces of the plunger with the lower cam surfaces associated with the bore to rotate the plunger.

In accordance with another aspect of the present invention, a valve is provided, which has a valve open position and a valve closed position. The valve includes a first passageway and a second passageway, a valve seat defining an opening in fluid communication with the first passageway, a bobbin having a longitudinally extending bore disposed in fluid communication with the second passageway and the opening, an armature movably disposed within the bore of the bobbin, wherein the armature includes a seal surface configured to seal against the valve seat and close the opening, a spring configured to bias the armature in a first direction, and a solenoid coil disposed in surrounding relationship with the bobbin. The solenoid coil in some embodiments has an energized state and a non-energized state, where the solenoid coil is capable of being energized to selectively move the armature in a second direction opposite the first direction to a first position during the energized state. The valve further includes a latching mechanism. In some embodiments, the latching mechanism includes a plurality of upper cam surfaces opposing a plurality of lower cam surfaces, the upper and lower cam surfaces associated with the bore, and a plurality of cam elements extending radially from the armature, each cam element comprising an upper cam surface and a lower cam surface. In use, movement of the armature during the energized state in the second direction to the first position engages the upper cam surfaces of the armature with the upper cam surfaces of the bore to rotate the armature, and thereafter, movement of the armature in the first direction during the de-energized state engages the lower cam surfaces of the armature with the lower cam surfaces of the bore to rotate the armature and maintain the armature in a valve open position.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following description sets forth one or more examples of valves, and more particularly, of linear actuated valves for controlling the flow of fluid between a first passageway and a second passageway. In several embodiments described herein, a solenoid actuated valve is provided that selectively permits and prohibits fluid flow communication between the first passageway and the second passageway. In some embodiments, a solenoid actuated valve includes a mechanical latch that provides a de-energized yet valve open position.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. It will be appreciated that embodiments of the present disclosure may employ any combination of features described herein.

Figure 1:
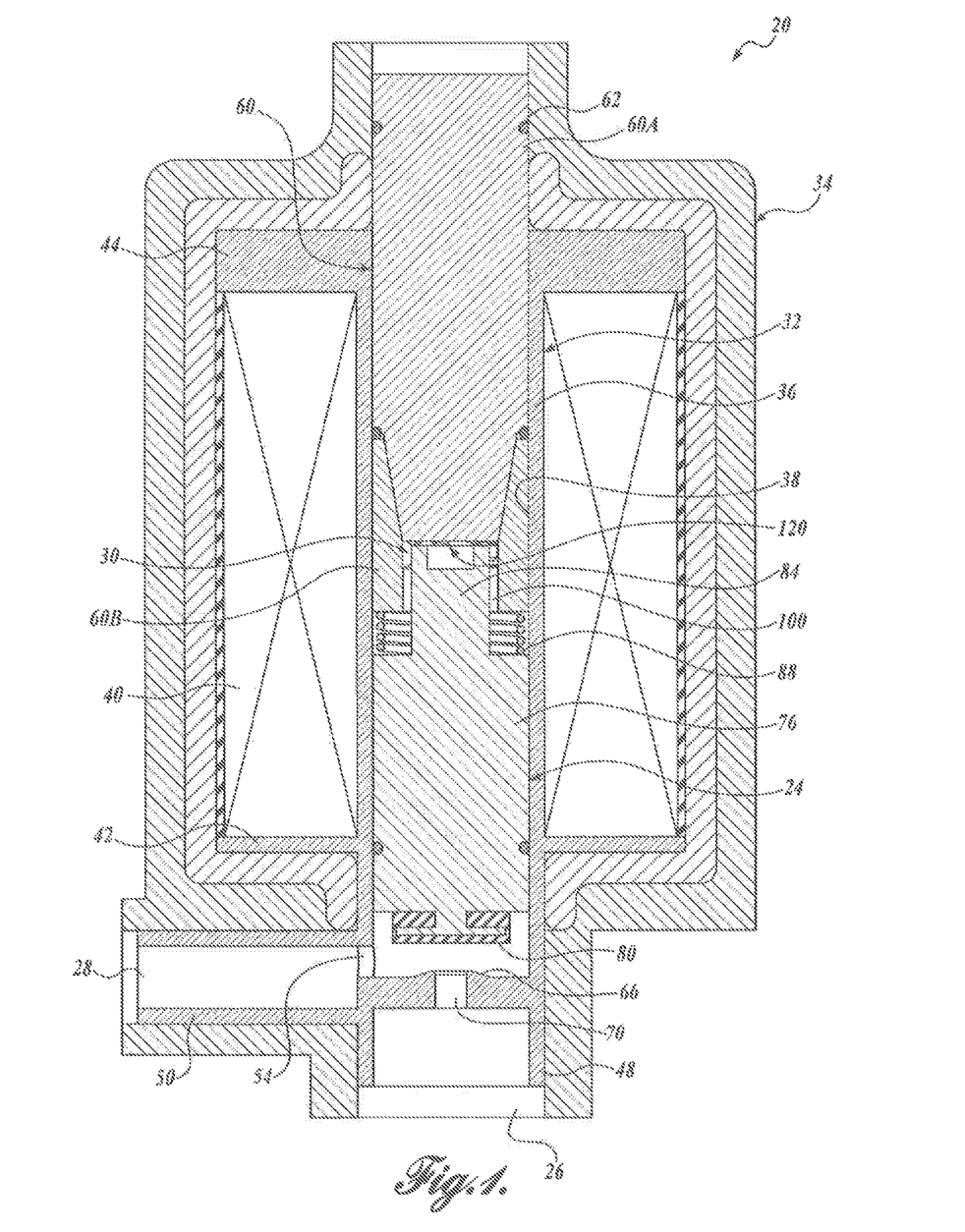
FIG. 1 is a cross sectional view of one exemplary embodiment of a solenoid valve formed in accordance with aspects of the present disclosure, wherein the armature is in an intermediate position.
Figure 2:
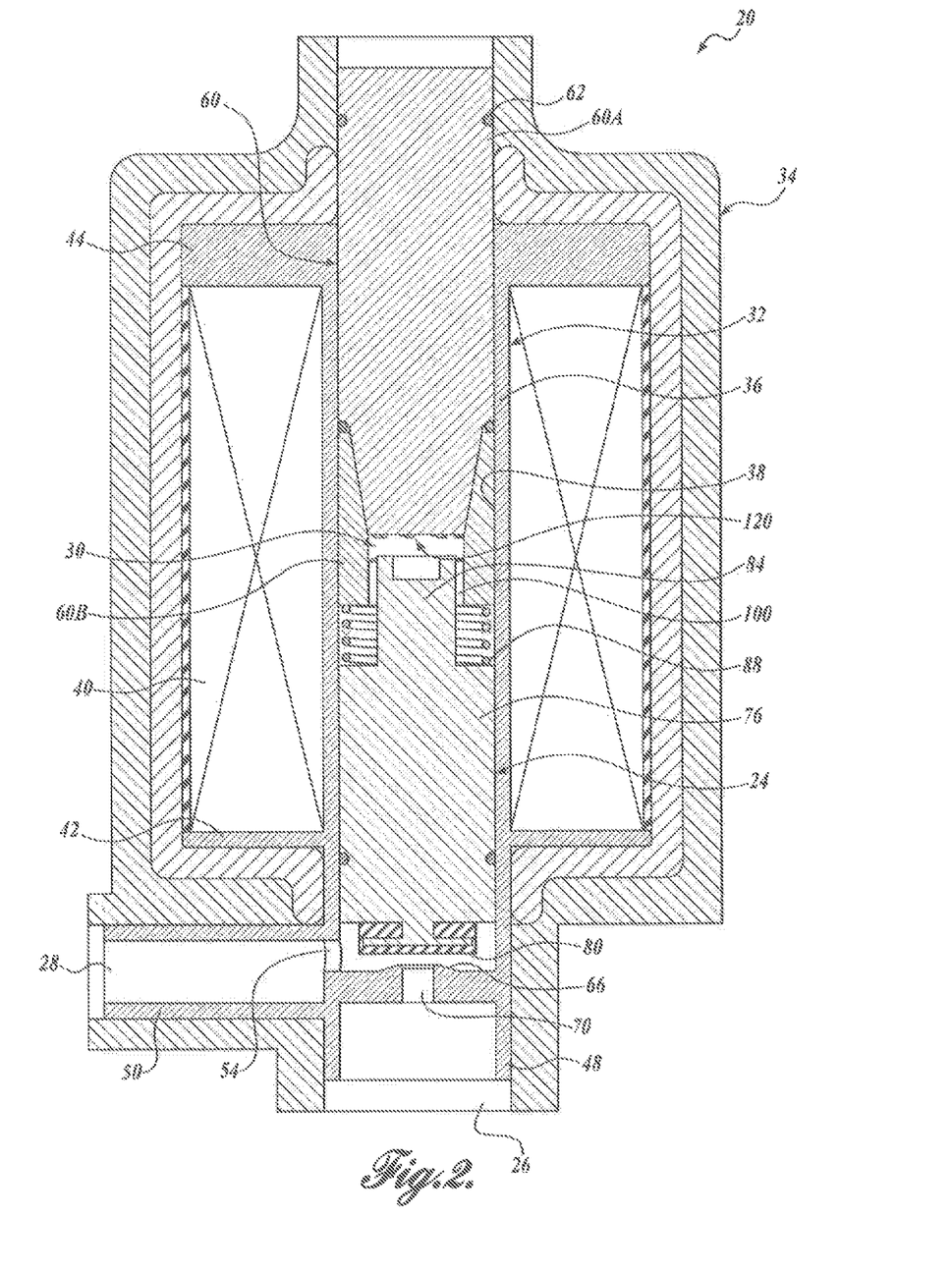
FIG. 2 a cross sectional view of the solenoid valve of FIG. 1, wherein the armature is in a valve open position.
Figure 3:
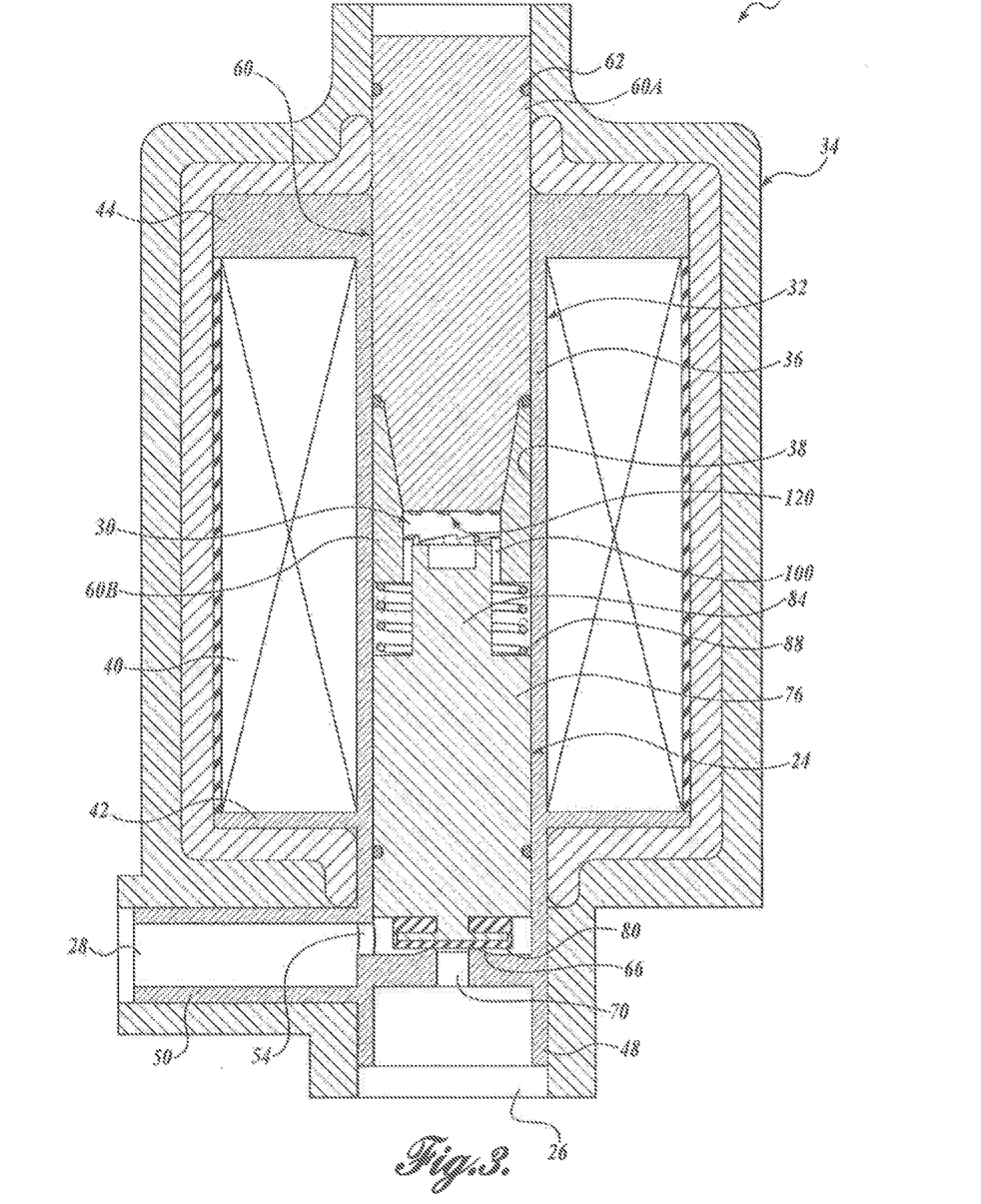
FIG. 3 is a cross sectional view of the solenoid valve of FIG. 1, wherein the armature is in a valve closed position.

Referring now to FIGS. 1-3, there is shown an example of a linear actuated valve, generally designated 20, formed in accordance with aspects of the present disclosure. As best shown in FIG. 1, the valve 20 includes a selectively movable armature 24, sometimes referred to as a plunger, which opens and closes the valve 20, thereby selectively connecting and disconnecting in fluid communication a first passageway 26 with a second passageway 28. The first passageway 26 may be adapted to be connected to a supply of pressurized fluid and the second passageway 28 may be adapted to be connected to a device for delivery of such fluid, and vice versa. As will be described in more detail below, the valve 20 further includes a latching mechanism 30 that enables the valve 20 to alternate between a mechanically locked open position and a mechanically locked closed position via selective actuation of a linear actuator, such as the energization of a solenoid.

Referring again to FIGS. 1-7B, the components of the valve 20 will now be described in more detail. As best shown in the cross sectional view of FIG. 1, the valve 20 includes a bobbin 32, which is disposed within a housing 34. The bobbin 32 includes a tubular portion 36 that defines an elongated internal cavity 38. In the embodiment shown, a solenoid coil 40 is wound around the tubular portion 36 of the bobbin 32 between first and second spaced flanges 42 and 44 integrally formed or otherwise secured to the tubular portion 36. The tubular portion 36 of the bobbin 32 extends longitudinally beyond the first flange 42 to define an integrally formed inlet section 48 and outlet section 50. In the embodiment shown, the inlet section 48 includes the first passageway 26 and the outlet section 50 includes the second passageway 28. An aperture 54 in the outlet section 50 of the bobbin 32 provides a fluid connection between the second passageway 28 and the elongated internal cavity 38 of the tubular portion 36 of the bobbin 32.

A generally cylindrical, pole piece 60 is disposed generally in the tubular portion 36 of the bobbin 32 and, cooperatively with one or more O-rings 62, substantially closes one end of the elongate inner cavity 38. An annularly elevated valve seat 66 is integrally formed or otherwise positioned at the opposite end of the tubular portion 36, thereby closing the second end of the elongated inner cavity 38. The valve seat 66 defines a central aperture 70 that provides a fluid connection between the first passageway 26 and the elongated internal cavity 38 of the tubular portion 36 of the bobbin 32.

Still referring to FIG. 1, the armature 24 is slidably disposed in the elongated inner cavity 38 of the tubular portion 36 between the pole piece 60 and the valve seat 66. In the embodiment shown, the armature 24 includes a generally cylindrical body section 76. At the end of the armature 24 nearest the valve seat 66, a seal 80, such as a layer of polymeric, elastomeric, or rubberized material, is provided. The seal 80 is positioned so as to overlie the central aperture 70 of the valve seat 66 when the armature 24 is urged against the valve seat 66 in the valve closed position (See FIG. 3), thereby prohibiting fluid flow between the first passageway 26 and the inner cavity 38. At the end of the armature 24 opposite the seal 80, the armature 24 includes a boss 84 extending outwardly toward the pole piece 60. The boss 84 is of a smaller diameter than the body section 76 and coaxial with the body section 76. As assembled, a spring 88, such as a coil spring, is positioned between the armature 24 and a pole piece 60. In the embodiment shown, the spring 88 is positioned around the boss 84 of the armature 24 in-between a shoulder surface of the armature 24 and an end surface of pole piece 60. The spring 88 normally biases the armature 24 away from the pole piece 60 and toward a valve seat 66.

The pole piece 60 and the armature 24 are made primarily of a ferrous material, such that when the solenoid coil 40 is energized, the generated magnetic field will cause the pole piece 60 and the armature 24 to be magnetically attracted, thereby forcibly moving the armature 24 toward the pole piece 60. The armature 24 is forcibly moved against the biasing force of the spring 88, and as a result, disengages the seal 80 from the valve seat 66 to open the valve 20. When the solenoid coil 40 is de-energized, the spring 88 biases the armature 24 toward the valve seat 66 and the closed position. As such, the solenoid is of the pull type.

In accordance with aspects of the present disclosure, the valve 20 further includes a mechanical latching mechanism, generally designated 30, that maintains the armature 24 in alternatingly raised and lower positions (open and closed positions) during a de-energized condition of the solenoid coil 40. As a result, the armature moves within the chamber 38 between three positions, which are: 1) valve closed, solenoid de-energized (hereinafter "the valve closed position") as shown in FIG. 3; 2) valve open, solenoid energized (hereinafter "the intermediate position") shown in FIG. 1; and 3) valve open, solenoid de-energized (hereinafter "the valve open position") shown in FIG. 2. In use, as will be described in more detail below, a single energized pulse to the solenoid coil 40 transitions the armature 24 between the valve open position and the valve closed position. As such, at least two energized pulses can operate the valve through a complete cycle (e.g., valve closed to valve open and then back to valve closed).

Turning now to the examples illustrated in FIGS. 4-7B, one embodiment of the latching mechanism may be formed from cooperating features of the pole piece 60 and the armature 24. In the embodiment shown in FIGS. 4-6, the pole piece 60 is comprised of cooperating upper and lower pole piece sections 60A and 60B, although a singular pole piece may be practiced with embodiments of the present disclosure. In either case, the end portion of the pole piece 60 facing the valve seat 66 (FIG. 1) defines a cylindrical socket 92 for receiving the boss 84 of the armature 24 as the armature 24 is forcibly moved away from the valve seat 66 against the spring 88 by energizing the solenoid coil 40.

The latching mechanism 30 includes a plurality of first armature engaging interfaces 100. In some embodiments, the interfaces 100 are formed on the inner side walls 94 of the socket 92. In the embodiment shown, the plurality (shown as four) of first armature engaging interfaces 100 are evenly spaced apart around the inner perimeter of inner side walls 94 (shown in FIGS. 5B and 6 as integrally formed on the pole piece section 60B). The plurality of first armature engaging interfaces 100 extend inwardly into the socket 92 and define grooves or parallely extending slots 106 between one another. As will be described in more detail below, the slots 106 are sized and configured to slidably receive sections of the armature 24 for providing guided, translational movement of the armature between the valve closed position and the intermediate position. At the same time, the slots also provide minimal rotation of the armature as it translates within slots 106.

Figure 5A:
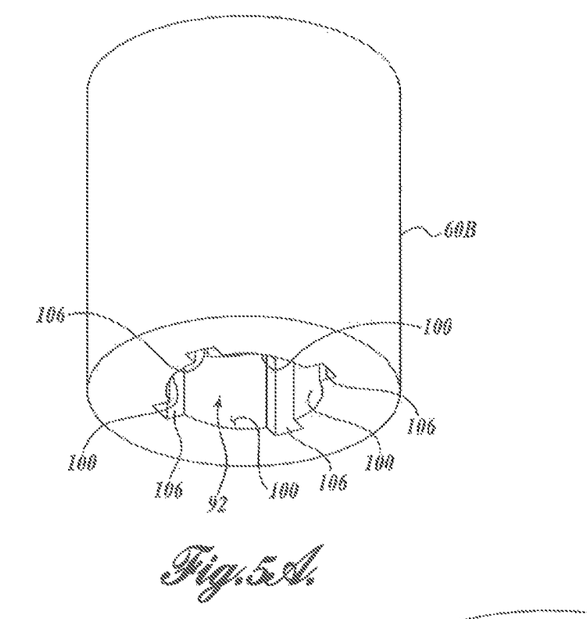
FIG. 5A is a perspective view of one embodiment of a lower pole section formed in accordance with aspects of the present disclosure.
Figure 5B:
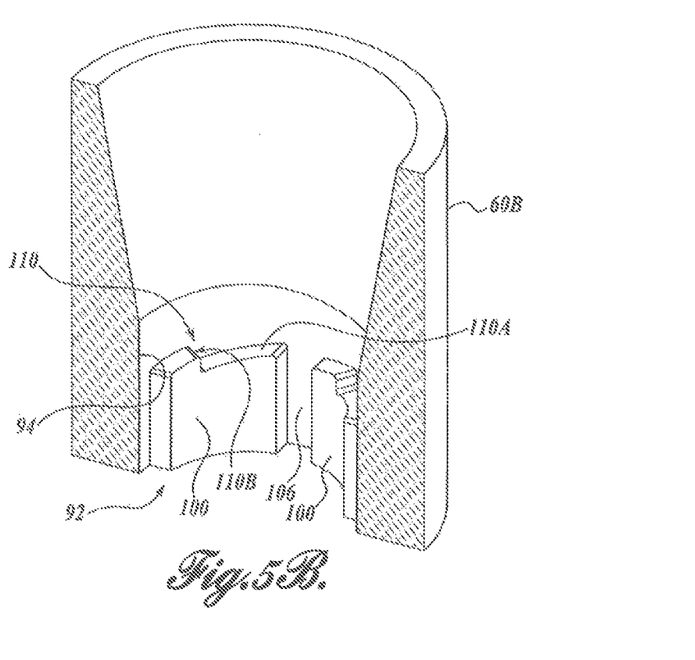
FIG. 5B is a perspective, cross sectional view of the lower pole section of FIG. 4A.
Figure 6:
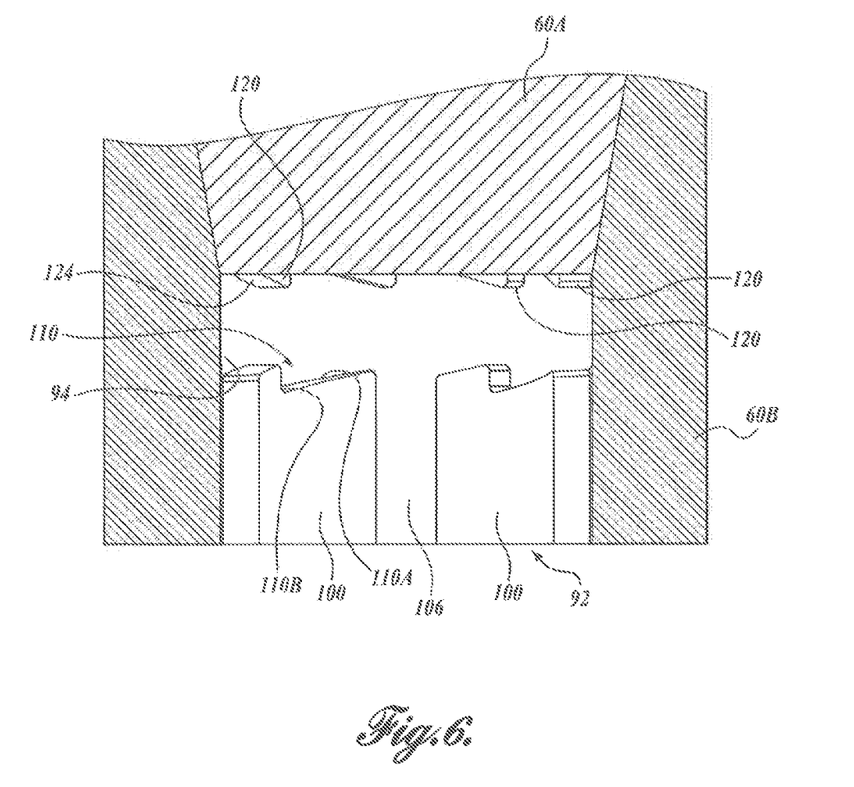
FIG. 6 is a partial cross sectional view of one embodiment of the pole piece formed in accordance with aspects of the present disclosure, the pole piece comprising the upper pole section of FIG. 4 and the lower pole section of FIG. 5A.

Each first armature engagement interface 100 further includes a cam surface 110 facing away from the valve seat 66 in the longitudinal direction of chamber 38 (See FIG. 1). In that regard, each cam surface 110 is configured to cooperate with a portion of the armature 24 in order to rotate and lock the armature 24 as described below. In one embodiment, the cam surfaces 110 define a first or guide portion 110A and a second or notch portion 110B, as best shown in FIGS. 5B and 6. As will be described in more detail below, when the armature 24 interfaces with the cam surfaces 110, the cam surfaces 110 cause the armature 24 to rotate along the guide portion 110A and contact the notch portion 110B, thereby retaining or "locking" the armature 24 into the de-energized, open position.

The latching mechanism 30 also includes a plurality of second armature engaging interfaces 120. In the embodiment shown, the plurality (shown as eight) of second armature engaging interfaces 120 are evenly spaced apart around the perimeter of an inner end surface 116 of the pole piece 60 (shown in FIG. 4 with pole piece 60A). The plurality of second armature engaging interfaces 120 extend inwardly into the socket 92 generally orthogonal to the first armature engaging interfaces 100, as best shown in FIG. 6. Each second armature engaging interface 120 includes a cam surface 124 facing toward valve seat 66. When assembled, alternating (i.e., every other) second armature engaging interface 120 generally aligns with the slots 106. The plurality of second armature engaging interfaces 120 function to rotate the armature 24 a selected amount (e.g. 45 degrees) when the armature 24 contacts the pole piece 60. In operation, the armature 24 contacts the plurality of second armature engaging interfaces 120 each time the solenoid coil 40 is energized. The linear position of the armature 24 shown in FIG. 1 in which the armature 24 contacts the plurality of the second armature engagement interfaces 120 when the coil 40 is energized is referred to herein as the intermediate position.

Figure 4:
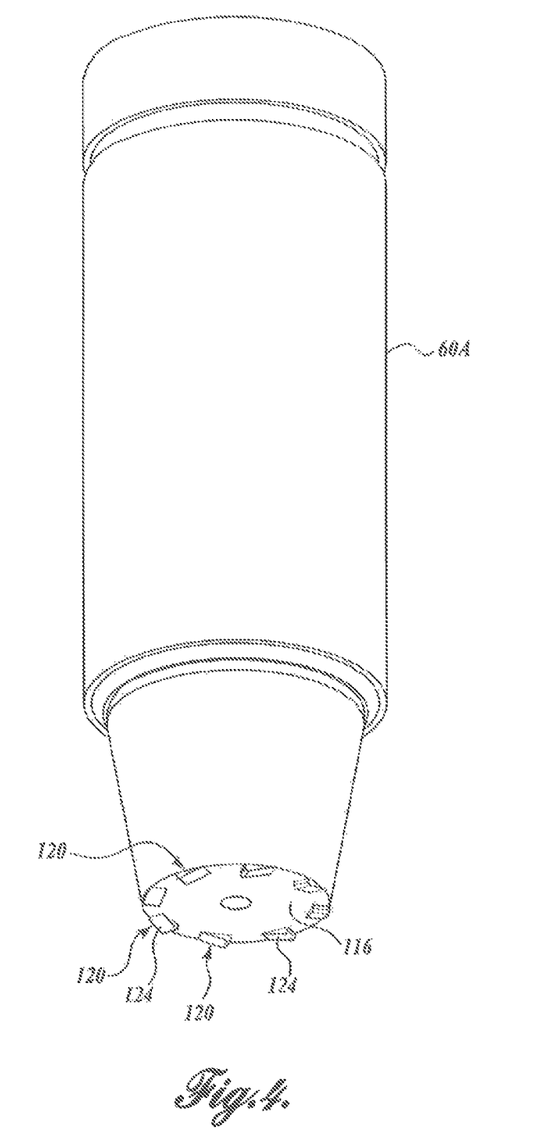
FIG. 4 is a perspective view of one embodiment of an upper pole section formed in accordance with aspects of the present disclosure.
Figures 7A, 7B:
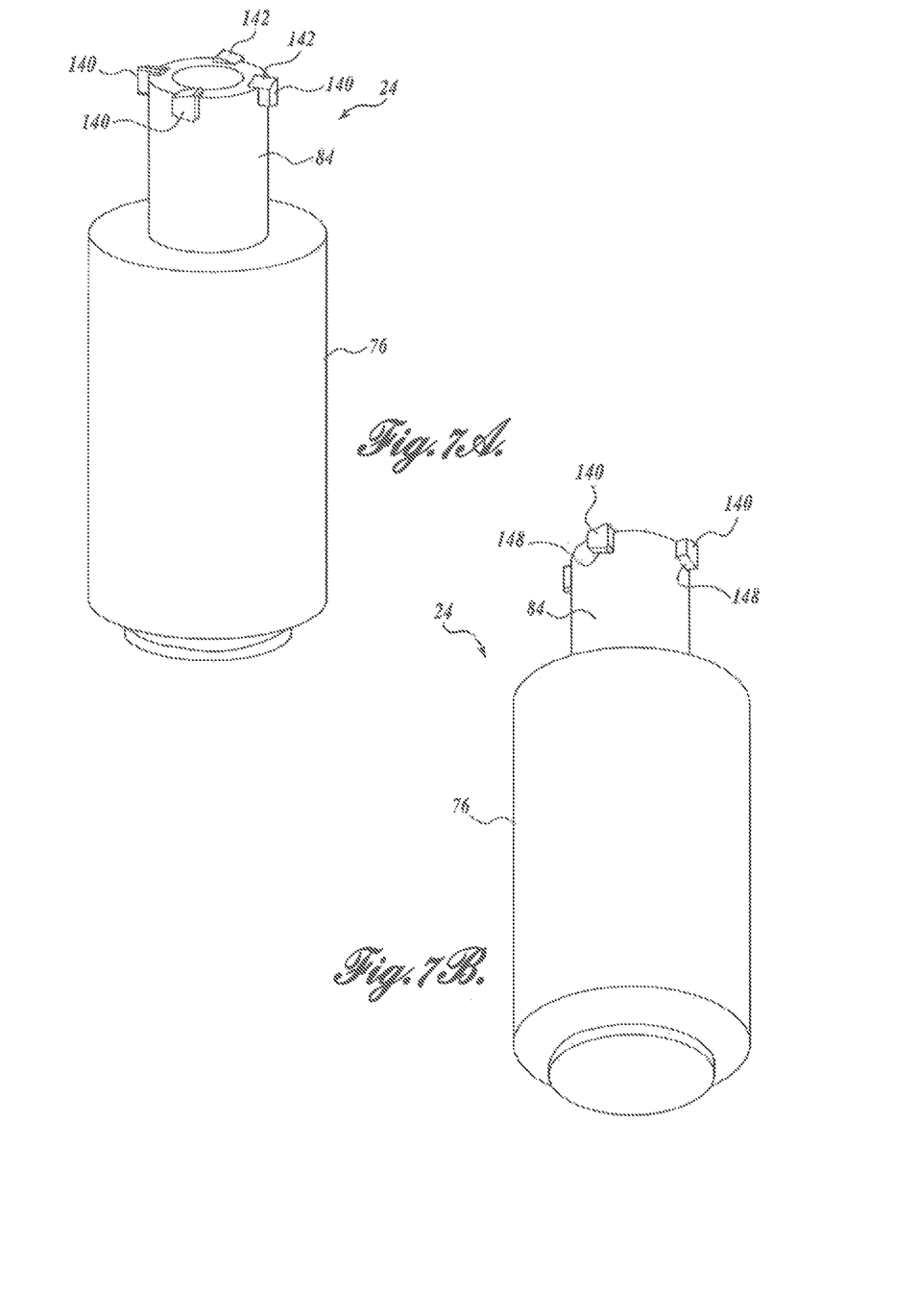
FIGS. 7A and 7B are perspective views of one embodiment of an armature formed in accordance with aspects of the present disclosure.

The latching mechanism 30 further includes a plurality of teeth 140 disposed at the upper end of the boss 84 of the armature 24, as best shown in FIG. 4. In the embodiment shown, the plurality (shown as four) of teeth 140 are evenly spaced apart around the outer perimeter of the boss 84. As shown in the embodiment of FIGS. 7A-7B, the teeth 140 radially extend outwardly and upwardly from the boss 84. Each tooth 140 is sized and configured to be slideably received within respective slots 106 of the pole piece 60. In the embodiment shown in FIG. 7A, the teeth 140 define first cam surfaces 142 on its upper surface (i.e., surface facing away from valve seat 66) for interfacing with the second armature engagement interfaces 120. The first cam surfaces 142 and the cam surfaces 124 are cooperatively configured such that when the armature teeth 140 contact the cam surfaces 124 of the second armature engagement interfaces 120, the upward biasing force provided by the energized coil 40 rotates the armature 24 relative to the pole piece 60) about a common longitudinal axis so that the armature teeth 140 are no longer aligned with the slots 106.

The teeth 140 further define second cam surfaces 148 on its lower surface (i.e., surface facing toward the valve seat 66) for interfacing with the cam surfaces 110 of the first armature engagement interfaces 100, as best shown in FIG. 7B. The second cam surfaces 148 are angled and somewhat parallel to the first portion 110A of the cam surfaces 110. As a result, when the armature teeth 140 contact the first armature engagement interface 100, the downward biasing force provided by the spring 88 (in a solenoid de-energized state) rotates the armature 24 relative to the pole piece 60 about a common longitudinal axis until the armature 24 is locked from further rotation (and translation toward the valve seat 66) by the notch portion 110B of the cam surfaces 110. On the other hand, when the valve 20 is in the valve closed position, the teeth 140 of the armature 24 are slidably engaged within slots 106. When so positioned, the slots 106 prevent rotation of the armature 24, while the spring 88 biases the armature 24 downward to keep the seal engaged with the valve seat 66.

One example operation of the valve 20 will now be described with reference with FIGS. 1-7B. As best shown in FIG. 3, the valve 20 is in the valve closed position, where 1) the solenoid coil 40 is in a de-energized state; 2) the spring 88 is forcibly biasing the armature 24 against the valve seat 66; 3) the seal 80 is blocking the aperture 70; and the teeth 140 of the armature 24 are positioned within the slots 106, thereby preventing rotation of the armature 24 (See FIGS. 6 and 7A-7B). To open the valve 20, the solenoid coil 40 is energized, causing the armature 24 to move away from the valve seat 66. As the armature 24 moves away from the valve seat 66 against the biasing force of the spring 88, the seal 80 unblocks the aperture 70, the teeth 140 slide within the slots 106 with minimal rotation, and the spring 88 compresses. During energization, the armature teeth 140 move through and out of the slots 106 of the pole piece 60, and continue to move away from the valve seat 66 to the intermediate position shown in FIG. 1. In the intermediate position, the armature teeth 140 contact the second armature engagement interfaces 120. Due to the cooperating cam surfaces 144 and 124 of the teeth 140 and second armature engagement interfaces 120, respectively, the upward biasing force provided by the energized coil 40 rotates the armature 24 relative to the pole piece 60 so that the armature teeth 140 are no longer aligned with the slots 106 formed in pole piece 60.

When the coil 40 is de-energized, the spring 88 biases the armature 24 toward the valve seat 66. Since the teeth 140 are no longer aligned with the slots 106, the armature teeth 140 contact the cam surfaces 110 of the first armature engagement interfaces 100 at the guide portion 110A. The guide portion 110A of the cam surfaces 110 of the pole piece 60 are angled and somewhat parallel to the lower cam surfaces 148 of the armature teeth 140 so that after contact is made, the continued downward force applied by the spring 88 rotates the armature 24 until the armature teeth 24 are fully engaged with notch portion 110B. When so located, the spring 88 biases the armature teeth 140 against the notch portion 110B to maintain the position of the armature 24 such that the seal 80 is located above the valve seat 66 in an unseated position. Thus, the valve 20 is maintained in an open, but mechanically locked position when the coil is de-energized, which is otherwise known as the valve open position and shown best in FIG. 2.

To close the valve 20, the solenoid coil 40 is again energized to move the armature 24 upward against the biasing force of the spring 88. When the upper cam surfaces 144 of the armature teeth 140 again contact the second armature engagement interfaces 120 of the pole piece 60 in the intermediate position of FIG. 1, the armature 24 rotates until the armature teeth 140 are again aligned with the slots 106. The coil 40 is then de-energized, and the biasing force of the spring 88 moves the armature 24 away from the second armature engagement interfaces 120 so that the armature teeth 140 are received within and slide along the slots 106 until the armature 24 has reached the valve closed position shown best in FIG. 3. In the valve closed position, the seal 80 is engaged with the valve seat 66, thereby preventing fluid communication between the first passageway and the second passageway 28. The valve 20 is maintained in a closed position when the coil is de-energized by the biasing force of the spring 88.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including." "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing. Therefore, the description of "A" component facing "B" component herein may contain the situations that "A" component facing "B" component directly or one or more additional components is between "A" component and "B" component.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A solenoid actuator, comprising:
   a bobbin having a longitudinally extending bore;
   a plunger rotatably and slideably disposed within the bore of the bobbin;
   a spring configured to bias the plunger in a first direction;
   a solenoid coil disposed in surrounding relationship with the bobbin, the solenoid coil having an energized state and a non-energized state, where the solenoid coil is capable of being energized to selectively move the plunger in a second direction opposite the first direction during the energized state;
   a pole member positioned within the bore and associated with the solenoid coil; and
   a latching mechanism, comprising:
      (i) a plurality of upper cam surfaces opposing a plurality of lower cam surfaces, the plurality of upper cam surfaces located on an upper pole piece section of the pole member, and the plurality of lower cam surfaces located on a lower pole piece section of the pole member; and
      (ii) a plurality of cam elements extending radially from the plunger, each cam element comprising an upper cam surface and a lower cam surface,
   wherein: 1) movement of the plunger in the second direction engages the upper cam surfaces of the plunger with the upper cam surfaces on the upper pole piece section of the pole member to rotate the plunger; and 2) movement of the plunger in the first direction engages the lower cam surfaces of the plunger with the lower cam surfaces on the lower pole piece section of the pole member to rotate the plunger.

2. The solenoid actuator of claim 1, wherein the plunger is guided during at least a portion of its translational path.

3. The solenoid actuator of claim 1, wherein the biasing force of the spring and the interaction of the lower cam surfaces of the plunger with the lower cam surfaces on the lower pole piece section of the pole member causes the plunger to rotate to a selectively fixed position.

4. The solenoid actuator of claim 1, wherein movement in the first direction is during the non-energized state.

5. A valve having a valve open position and a valve closed position, comprising:
   a first passageway and a second passageway;
   a valve seat defining an opening in fluid communication with the first passageway;
   a bobbin having a longitudinally extending bore disposed in fluid communication with the second passageway and the opening;
   an armature movably disposed within the bore of the bobbin, wherein the armature includes a seal surface configured to seal against the valve seat and close the opening;
   a spring configured to bias the armature in a first direction;
   a solenoid coil disposed in surrounding relationship with the bobbin, the solenoid coil having an energized state and a non-energized state, where the solenoid coil is capable of being energized to selectively move the armature in a second direction opposite the first direction to a first position during the energized state;
   a pole member positioned within the bore and associated with the solenoid coil; and
   a latching mechanism, comprising:
      (i) a plurality of upper cam surfaces opposing a plurality of lower cam surfaces, the plurality of upper cam surfaces located on an upper pole piece section of the pole member, and the plurality of lower cam surfaces located on a lower pole piece section of the pole member; and
      (ii) a plurality of cam elements extending radially from the armature, each cam element comprising an upper cam surface and a lower cam surface,
   wherein: (1) movement of the armature during the energized state in the second direction to the first position engages the upper cam surfaces of the armature with the upper cam surfaces on the upper pole piece section of the pole member to rotate the armature; and thereafter (2) movement of the armature in the first direction during the de-energized state engages the lower cam surfaces of the armature with the lower cam surfaces on the lower pole piece section of the pole member to rotate the armature and maintain the armature in a valve open position.

6. The valve of claim 5, wherein the armature is guided during at least a portion of its translational path.

7. The valve of claim 5, wherein the biasing force of the spring causes the armature to rotate to a conditionally secured position.

8. The valve of claim 6, wherein the secured position is the valve closed position.

9. The valve of claim 6, wherein the secured position prohibits further rotation of the armature as well as movement in the first direction.

10. The valve of claim 5, wherein movement during the energized state in the second direction from the valve open position engages the upper cam surfaces of the armature with the upper cam surfaces on the upper pole piece section of the pole member to rotate the armature, and thereafter, movement of the armature in the first direction during the de-energized state positions the armature in the valve closed position.

11. The valve of claim 10, wherein when the armature moves to the second direction in the energized state, the spring stores a biasing force.

12. The valve of claim 11, wherein the armature moves to the valve closed position in the de-energized state by the biasing force of the spring.

13. The valve of claim 12, wherein the armature is conditionally maintained in the valve closed position by the biasing force of the spring.

* * * * *

UNITED STATES PATENT AND TRADEMARK OFFICE
CERTIFICATE OF CORRECTION

| | | |
|---|---|---|
| PATENT NO. | : 9,068,668 B2 | Page 1 of 1 |
| APPLICATION NO. | : 13/830669 | |
| DATED | : June 30, 2015 | |
| INVENTOR(S) | : B. T. Grover | |

It is certified that error appears in the above-identified patent and that said Letters Patent is hereby corrected as shown below:

COLUMN    LINE

8         66    "claim 6" should read --claim 7--
(Claim 8, line 1)

9         1     "claim 6" should read --claim 7--
(Claim 9, line 1)

Signed and Sealed this
Ninth Day of August, 2016

Michelle K. Lee
*Director of the United States Patent and Trademark Office*